July 21, 1964　　　F. C. POWERS　　　3,141,400

EXPANDABLE CAKE PAN

Filed Nov. 13, 1961

INVENTOR.
FRANK C. POWERS
BY Price & Heneveld
ATTORNEYS

3,141,400
EXPANDABLE CAKE PAN
Frank C. Powers, 24 Peterson Drive, Storm Lake, Iowa
Filed Nov. 13, 1961, Ser. No. 151,848
1 Claim. (Cl. 99—439)

This invention relates to commercial food products and containers, and more particularly to a packaged cake batter and pan.

A freshly baked cake just out of the oven is a source of pleasure in any home. Since, however, even cake mixes require a substantial amount of time and effort for preparation before baking and clean-up after baking, freshly baked cakes are relatively rare in many homes today. It would therefore be desirable to have available an unbaked cake package which requires no mixing, no preparation time or effort, and no extra pans, but which could be stored for an extended period of time and then placed as is into the oven at any desired time. The unbaked item, however, should be compact to enable economical, convenient, and undamaged shipping, handling, storing, and selling thereof.

It is, therefore, the principal object of this invention to provide such a packaged item capable of producing a freshly baked cake at any desired time merely by baking it. No mixing is required. No additional pans are utilized. No appreciable time is required. The packaged assembly may be shipped, stored, and handled in a compact, economical and convenient condition.

It is another object of this invention to provide a novel cake pan capable of serving as a compact storage container and shipping container, an expanded baking container, and a baked cake holder. The compact container is quickly and easily changeable to an expanded baking and holding container without disturbing the batter to be baked therein.

Another object of this invention is to provide an expandable pan capable of normally retaining frozen angel food cake batter for shipping and storage and capable of being expanded to bake the cake and retain the complete baked angle food cake. The pan includes a frusto-conical central spacer necessary for proper heat distribution to the baking angel food cake batter.

The pan is relatively simple in construction, with its components capable of being formed by high speed, die stamping techniques.

These and other objects of the invention will be apparent from a study of the following specification in conjunction with the drawings in which.

Basically, the invention comprises a cake pan and packaged food product embodying the pan. The pan is telescopically collapsible or expandable. It is capable of retaining frozen cake batter in the collapsed condition and of retaining the baked expanded cake in the expanded condition. The wrapped, collapsed pan and batter may be readily handled, assumes only a relatively small amount of space, and possesses rigidity as a shipping container to resist damage. The pan includes a lower inner cake pan shell and an upper outer shell interlockable with the lower shell when in the expanded condition. A pan bottom resting within the lower shell includes a central frusto-conical spacer element. An upper frusto-conical spacer element telescopically interfittable with the lower one is fixedly linked to the upper shell by a cross handle or link.

Figure 1:
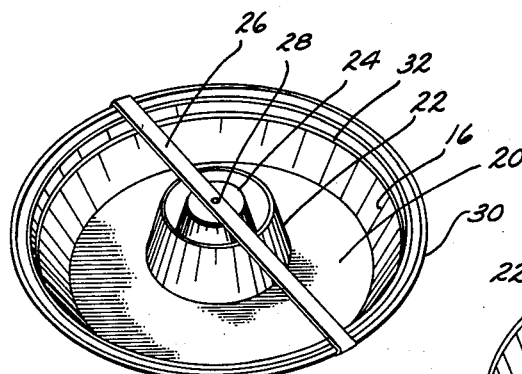
FIG. 1 is a perspective view of the novel cake pan in the collapsed condition.
Figure 2:
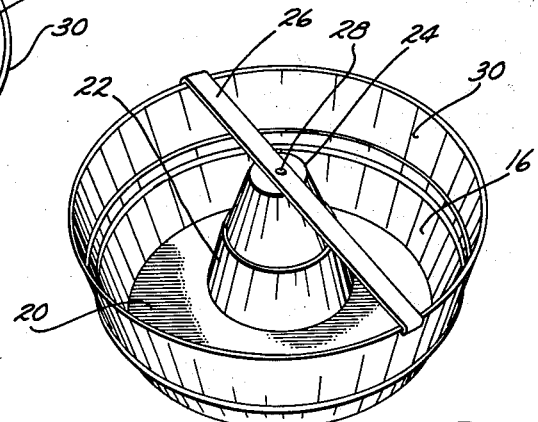
FIG. 2 is a perspective view of the cake pan illustrated in FIG. 1 in the expanded condition.
Figure 3:
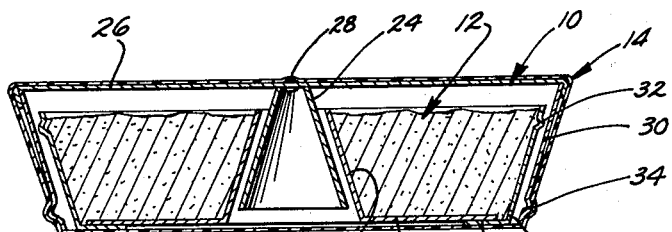
FIG. 3 is a cross-sectional view of the packaged assembly including the collapsed shipping and storage cake pan, frozen angel food cake batter, and a sealing cover wrapper.
Figure 4:
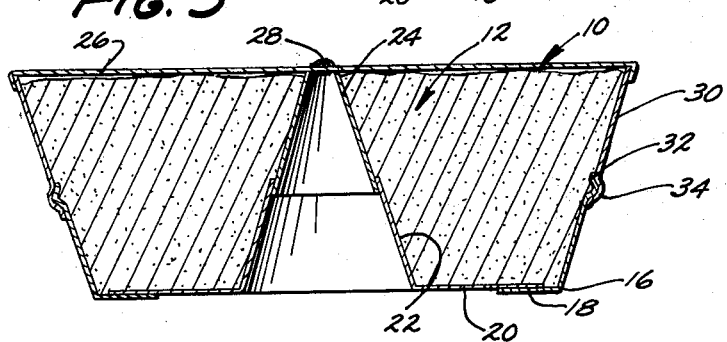
FIG. 4 is a sectional view of the assembly as altered to comprise an expanded and locked baking and cake holding pan, and the cake.

Referring now to the drawings, the packaged assembly includes pan 10, unbaked cake batter 12, and a sealing wrapper 14. Pan 10 is composed of a lower shell 16 including a horizontal, radially-inwardly directed flange 18 for supporting the bottom 20 of the pan. Bottom 20 includes an upwardly projecting hollow frusto-conical spacer element 22 interfitting telescopically with an upper frusto-conical spacer element 24 affixed to cross link or handle 26 at 28 as by staples or the like. Handle 26 is affixed at both ends to the peripheral edge of outer shell 30. Around the periphery of the lower shell adjacent the upper edge thereof is a male ridge means 32 which cooperates with female ridge means 34 around the periphery of the upper shell 34 adjacent the lower edge thereof. The two shell portions may be collapsed as in FIGS. 1 and 3, or expanded as in FIGS. 2 and 4 whereby the ridges 32 and 34 interlock to retain the pan in the expanded condition.

In the normal use of the novel assembly and pan, the angel food cake batter 12 is placed within the lower inner shell 16 which is of a sufficient size to retain the desired amount of batter. The collapsed pan with the cake batter therein is then suitably wrapped as by wrapper 14 which may be of a transparent plastic such as polyethylene, or of other suitable wrapping material, and frozen. The wrapped product may be placed in a shipping box or the like if desired. The compact packaged assembly may be shipped, stored, and handled over an extended period of time.

After the consumer purchases the packaged item from a grocery store or the like, he removes wrapper 14 and lifts handle 26 to expand the pan and interlock the upper and lower shells. At the same time, the central frusto-conical spacer necessary for proper heat distribution to the cake batter 12 is expanded. The pan and batter are then popped into the oven and baked for the necessary amount of time. The combined height of the two-shell elements to form the pan is sufficient to retain the baked cake 40 which expands a great deal during baking, as is well-known. The expanded cake pan thus keeps the sides of the cake and the interior thereof completely fresh since it prevents them from drying out.

Although the pan is especially adaptable to angel food and closely related cakes, it may in the broadest form of the invention, be adaptable to other frozen bakery products which expand considerably from the batter stage to the final baked stage. Various obvious modifications may appear to those skilled in the art upon studying the above disclosure. Thus, the invention is to be limited only by the scope of the appended claim and the reasonably equivalent structures to those defined therein.

I claim:

An angel food cake item assembly comprising: a lower inner pan shell having a bottom with a central opening; an upper outer pan shell telescopically interfittable with said lower shell to alternately assume a collapsed and an expanded relationship; interfitting locking ridges in said shells to retain them in the expanded condition when placed that way; a pan bottom element in said lower shell covering said central opening; a lower frusto-conical central spacer element projecting upwardly from said bottom element of said pan said spacer element being hollow and having imperforate walls and openings at both the top and bottom; an upper frusto-conical central spacer element telescopically interfittable with said lower element to an expanded and an alternate collapsed relationship; said upper spacer element being hollow and having imperforate walls and at least an opening in the bottom thereof;

said upper spacer element being joined to said upper shell element by a connecting link to thus be raised and alternately lowered therewith; said lower shell capable of being substantially filled with frozen angel food cake batter; said upper spacer element having a diameter at its lower end greater than the diameter of the upper end of the lower spacer element; said elements when telescopically extended having their walls forced together to prevent leakage therebetween whereby said pan when expanded is capable of retaining an expanded baked cake and said pan and spacer can be telescopically expanded and a batter baked therein.

References Cited in the file of this patent

UNITED STATES PATENTS

| | | |
|---|---|---|
| 1,053,660 | Smith | Feb. 18, 1913 |
| 1,296,742 | Bevington | Mar. 11, 1919 |
| 1,713,577 | Wentorf | May 21, 1929 |
| 2,627,801 | Danziger | Feb. 10, 1953 |
| 2,948,624 | Watson et al. | Aug. 9, 1960 |

FOREIGN PATENTS

| | | |
|---|---|---|
| 97,760 | Switzerland | Feb. 1, 1923 |
| 455,480 | Italy | Mar. 1, 1950 |